United States Patent
Garcia Redondo et al.

(10) Patent No.: US 12,327,027 B2
(45) Date of Patent: Jun. 10, 2025

(54) CHECKPOINTING

(71) Applicant: Arm Limited, Cambridge (GB)

(72) Inventors: Fernando Garcia Redondo, Cambridge (GB); Sahan Sajeewa Hiniduma Udugama Gamage, Cambridge (GB); Jonas Švedas, Cambridge (GB); Parameshwarappa Anand Kumar Savanth, Cambridge (GB)

(73) Assignee: Arm Limited, Cambridge (GB)

( * ) Notice: Subject to any disclaimer, the term of this patent is extended or adjusted under 35 U.S.C. 154(b) by 4 days.

(21) Appl. No.: 18/316,538

(22) Filed: May 12, 2023

(65) Prior Publication Data

US 2023/0376218 A1     Nov. 23, 2023

(30) Foreign Application Priority Data

May 17, 2022  (GB) .................................. 2207199.7

(51) Int. Cl.
    *G06F 3/06*        (2006.01)

(52) U.S. Cl.
    CPC .......... *G06F 3/0619* (2013.01); *G06F 3/0653* (2013.01); *G06F 3/0659* (2013.01); *G06F 3/0673* (2013.01)

(58) Field of Classification Search
    CPC ..... G06F 3/0619; G06F 3/0653; G06F 3/0659
    See application file for complete search history.

(56) References Cited

U.S. PATENT DOCUMENTS

| | | | | |
|---|---|---|---|---|
| 5,414,861 A | * | 5/1995 | Horning ............... | G06F 1/30 714/22 |
| 8,154,259 B2 | * | 4/2012 | Sartore ............... | G11C 16/30 320/167 |

(Continued)

FOREIGN PATENT DOCUMENTS

| EP | 3314363 B1 | 8/2021 |
|---|---|---|
| GB | 2591813 A | 8/2021 |

OTHER PUBLICATIONS

Journal of Systems Architecture, vol. 126, 2022, Singla Priyanka et al., "A survey and experimental analysis of checkpointing techniques for energy harvesting devices" URL: htt12s://www.sciencedirect.com/science/article/Qii/S 13 83 762122000534/Qdfft?md5=93640971ce6229e6b08bcb7fdd83a94&Qid=   I-s2.0-SI383762122000534-main.Qdf abstract, p. I-p. 18.
Balsamo, Domenico et al., Hibernus: Sustaining Computation during Intermittent Supply for Energy-Harvesting Systems, 2014 IEEE.
Balsamo, Domenico et al., Hibernus++: A Self-Calibrating and Adaptive System for Transiently-Powered Embedded Devices, IEEE Transactions on Computer-Aided Design of Integrated Circuits and Systems, 2015.

(Continued)

*Primary Examiner* — Edward J Dudek, Jr.
(74) *Attorney, Agent, or Firm* — NIXON & VANDERHYE P.C.

(57) ABSTRACT

In response to a power-loss warning event occurring during data processing, a checkpointing process is performed to save a checkpoint of context data associated with the data processing to non-volatile data storage. In response to detection of a power recovery event occurring when the checkpointing process is still in progress, it is determined whether a checkpoint abort condition is satisfied, based at least on a checkpoint progress indication indicative of progress of the checkpointing process. If the checkpoint abort condition is unsatisfied, the checkpointing process can continue. If the checkpoint abort condition is satisfied, the checkpointing process is aborted to allow the data processing to resume.

20 Claims, 8 Drawing Sheets

(56) References Cited

U.S. PATENT DOCUMENTS

| | | | | |
|---|---|---|---|---|
| 2006/0015683 A1* | 1/2006 | Ashmore | ............... | G06F 1/3268 |
| | | | | 711/135 |
| 2010/0202238 A1* | 8/2010 | Moshayedi | ......... | G06F 11/1666 |
| | | | | 714/E11.12 |
| 2013/0097458 A1* | 4/2013 | Sekino | ................ | G06F 11/1441 |
| | | | | 714/E11.138 |
| 2015/0363272 A1* | 12/2015 | Zheng | ................ | G06F 11/1471 |
| | | | | 714/19 |
| 2016/0378169 A1* | 12/2016 | Naeimi | .................. | G06F 1/263 |
| | | | | 713/323 |
| 2017/0322611 A1* | 11/2017 | Brennan | ............... | G06F 3/0625 |
| 2018/0013910 A1* | 1/2018 | Hashimoto | ........ | H04N 1/00928 |
| 2018/0181411 A1* | 6/2018 | Rothman | ............. | G06F 1/3234 |
| 2023/0043379 A1* | 2/2023 | Guyer | ................ | G06F 11/1446 |

OTHER PUBLICATIONS

Ransford, Benjamin et al., Mementos: System Support for Long-Running Computation on RFID-Scale Devices, ASPLOS'11, Mar. 5-11, 2011, Newport Beach, California, USA.

Singla, Priyanka et al., A Survey and Experimental Analysis of Checkpointing Techniques for Energy Harvesting Devices, School of Information Technology, IIT Delhi, New Delhi, India 110016, Mar. 28, 2022.

Lukosevicius, Giedrius et al., Using Sleep States to Maximize the Active Time of Transient Computing Systems, University of Southampton, U.K., ENSsys'17, Nov. 5, 2017, Delft, Netherlands.

* cited by examiner

CHECKPOINTING

CROSS-REFERENCE TO RELATED APPLICATION

This application claims priority pursuant to 35 U.S.C. 119(a) to British Application No. 2207199.7, filed May 17, 2022, which application is incorporated herein by reference in its entirety.

FIELD

The present technique relates to the field of data processing.

BACKGROUND

Some data processing systems may operate based on a potentially unreliable power source. If power is lost while performing data processing, some progress made in the data processing may be lost. To reduce the amount of work that has to be performed again after power is restored, a checkpoint of context state data can be saved to non-volatile data storage in response to a power-loss warning event. The power-loss warning event can be an event expected to occur before the power loss itself, which can be treated as a prediction that the power loss event may soon follow, and hence be used as a trigger for saving the checkpoint. After power recovers, the checkpoint can be restored and forward progress can continue.

SUMMARY

At least some examples provide a method comprising: in response to a power-loss warning event occurring during data processing, performing a checkpointing process to save a checkpoint of context data associated with the data processing to non-volatile data storage; and in response to detection of a power recovery event occurring when the checkpointing process is still in progress: determining, based at least on a checkpoint progress indication indicative of progress of the checkpointing process, whether a checkpoint abort condition is satisfied; in response to determining that the checkpoint abort condition is unsatisfied, allowing the checkpointing process to continue; and in response to determining that the checkpoint abort condition is satisfied, aborting the checkpointing process to allow the data processing to resume.

At least some examples provide a computer program which, when executed by a data processing apparatus, controls the data processing apparatus to perform the method described above. The computer program can be stored on a computer-readable storage medium. The storage medium can be a non-transitory storage medium.

At least some examples provide an apparatus comprising: checkpointing circuitry responsive to a power-loss warning event occurring during data processing to perform a checkpointing process to save a checkpoint of context data associated with the data processing to non-volatile data storage; and control circuitry responsive to detection of a power recovery event when the checkpointing process is still in progress, to: determine, based at least on a checkpoint progress indication indicative of progress of the checkpointing process, whether a checkpoint abort condition is satisfied; in response to determining that the checkpoint abort condition is unsatisfied, allow the checkpointing process to continue; and in response to determining that the checkpoint abort condition is satisfied, abort the checkpointing process to allow the data processing to resume on the processing circuitry.

BRIEF DESCRIPTION

Further aspects, features and advantages of the present technique will be apparent from the following description of examples, which is to be read in conjunction with the accompanying drawings, in which:

FIG. 1 schematically illustrates an example of an intermittent compute system;

DETAILED DESCRIPTION

Figure 1:
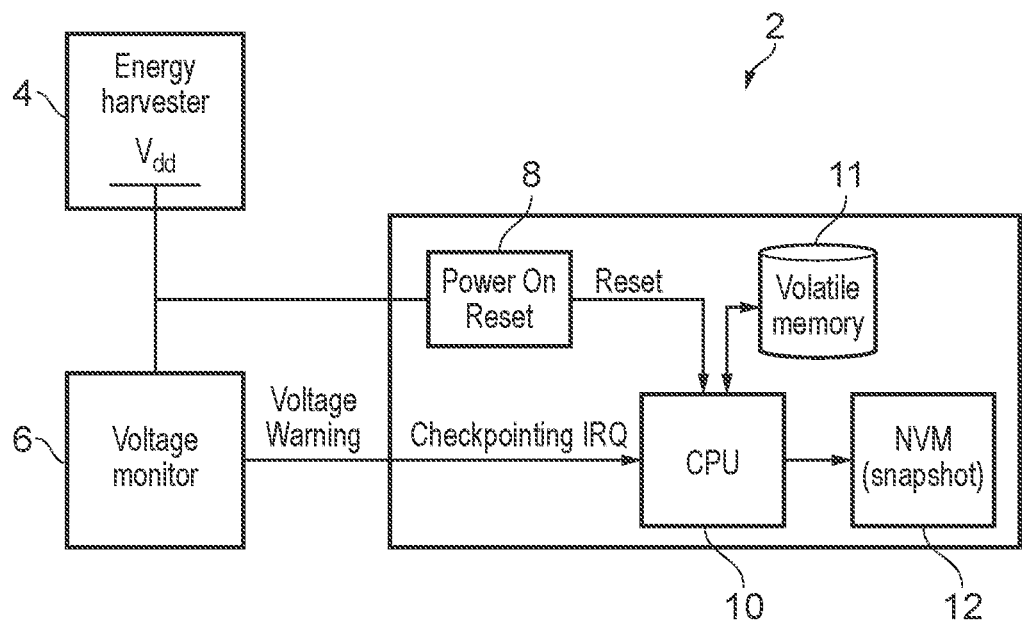

Sometimes, after a checkpointing process has begun following a power-loss warning event, the power may recover while the checkpointing process is still in progress. As the power has recovered, it is not necessary to complete the checkpointing process as the state being saved in the checkpointing process may still be accessible in volatile data storage. Nevertheless, it can sometimes be useful to continue with the checkpointing process, to ensure that a valid checkpoint is completed, to reduce the amount of work that has to be redone if power is subsequently lost and hence provide a guarantee of forward progress. However, performing the checkpointing process has a certain amount of cost from a number of factors, such as the high energy cost of writing to non-volatile data storage, a performance cost because of the lost opportunity to perform the data processing itself in a window of time when power is sufficiently available but is being used for the checkpointing process, and a wearout cost due to checkpointing causing additional writes to the non-volatile data storage (non-volatile data storage may have a limited lifetime, being subject to wearout so that the risk of failure increases with the number of times a given storage location has been written). Hence, the inventors have recognised that it may be inappropriate to adopt a fixed approach to deciding whether or not to complete the checkpointing process if the power recovers while the checkpointing is in progress. Instead, a dynamic approach is used where a checkpoint abort condition is evaluated to determine whether to either abort the checkpointing process or allow it to continue. Whether the checkpoint abort condition is satisfied is determined at least based on a checkpoint progress indication indicative of progress of the checkpointing process. This allows a more informed evaluation of the relative costs/risks of either aborting or completing the checkpointing. As a result, a better balance between processing performance (forward progress guarantees), efficiency of utilisation of potentially limited power and wear resistance can be achieved.

The checkpoint abort condition may be determined to be satisfied when the checkpoint progress indication indicates that a completed amount of the checkpointing process is less than a threshold amount. Hence, when relatively little progress in checkpointing has been made, the benefit of continuing with the checkpointing may be outweighed by the greater energy/performance cost of the writes to the non-volatile data storage that would be required to carry out the remaining part of the checkpointing process. In this case, better utilisation of the available power following the power recovery event can be made by allowing the functional data processing to resume instead of the checkpointing. On the other hand, when a larger amount of the checkpointing process is complete then some cost may already have been incurred in performing the checkpointing and the remaining cost may be lower, tilting the balance towards determining to continue with the checkpointing process. By completing, the checkpointing process this reduces the amount of computational resource already incurred in the data processing that would be wasted if a future power loss occurs without another checkpoint being taken.

The threshold amount could be a fixed threshold.

Alternatively, the threshold amount may be variable, e.g. software-programmable and/or selected dynamically based on information other than the checkpoint progress indication. For example, as discussed further below, the threshold may depend on the current execution state of the data processing. The threshold can also be dependent on a figure of merit or cost/benefit factor which may reflect the importance of the section of data processing whose data is being checkpointed and/or its properties such as the volume of data required to be checkpointed for that section of data processing and/or the computational cost of calculating that data incurred so far. Sections of data processing which are to be weighted to make it less likely that checkpointing is aborted (so more likely that a checkpoint is taken) can be allocated a lower threshold, while other sections of data processing to be weighted to make it more likely that checkpointing is aborted (enabling processing to resume without completing the checkpoint) can be allocated a higher threshold.

The checkpoint progress indication can be represented in a number of different ways. For example, the checkpoint progress indication could be an explicit or implicit indication of how much of the checkpointing process has been completed and/or how much of the checkpointing process remains to be completed. For example, checkpoint progress can be measured in terms of a quantitative indication (e.g. number of bytes, number of cache lines, or a fraction/percentage of the total size of the data to be checkpointed) representing either an amount of checkpoint data already written to the nonvolatile storage or an amount of checkpoint data remaining to be written to the non-volatile storage. Another option could be to use a less precise indication, such as an indication of which stage of two or more stages of checkpointing has been reached in the checkpointing process. The threshold can be represented in the corresponding way to the checkpoint progress indication allowing a comparison of whether or not an amount of checkpointing progress has yet reached the threshold amount.

The checkpoint progress indication could be maintained either by software, or by hardware.

If software is responsible for performing the checkpointing, then as the software requests various memory write operations to write the checkpoint data to the non-volatile data storage, the software can maintain the checkpoint progress indication by updating it to correspond with the amount of checkpoint data saved to the non-volatile data storage so far. For example, the software may periodically write an updated value for the checkpoint progress indication to a memory location within volatile or non-volatile storage. In response to the power recovery event occurring while checkpointing is still in progress, software that evaluates the checkpoint abort condition could read the checkpoint progress indication from that memory location and use it to determine whether to continue with checkpointing the process.

On the other hand, some implementations may provide hardware which can be controlled by software to perform the checkpointing processing without requiring individual control of each memory write operation by software. For example, the hardware could be a direct memory access controller or some control logic associated with a tightly coupled memory (a local memory provided for fast deterministic access by a CPU or other processor, similar to a cache but without use of a hardware-managed replacement policy so that data placed in the tightly coupled memory will remain stored in the tightly coupled memory until either power is lost or the data is explicitly removed or overwritten in response to a request made by software). Such hardware could be configured (e.g. by software setting configuration parameters for identifying the data to be transferred, such as source/destination addresses and a size of the data to be transferred) to generate the memory access requests for transferring the checkpoint data from volatile data storage to the non-volatile data storage. That hardware may maintain the checkpoint progress indication in a software-readable storage location (e.g. a location in volatile or non-volatile memory or a memory-mapped register), so that software can read the checkpoint progress indication to determine how much of the checkpointing process has been completed yet. The software executing in response the power recovery event can therefore determine whether to abort the checkpointing process or continue with the checkpointing process depending on the checkpoint progress indication read from the software-readable storage location. By providing hardware assistance in maintaining the checkpoint progress indication, this reduces the overhead for software in performing the checkpointing (as the software does not need to perform additional memory accesses for maintaining the checkpoint progress indication), improving performance compared to a purely software-maintained checkpoint progress indication.

As well as depending on the checkpoint progress indication, whether the checkpoint abort condition is satisfied may also depend on a current execution state of the data processing. This recognises that whether it is better to complete or abort the checkpointing process may be workload-dependent, e.g. depending on the type of task being performed and/or the progress made through that task up to the point at which the power-loss warning event occurred causing the task to be interrupted to perform the checkpointing process.

Hence, by considering the current state of processing in deciding whether the checkpoint abort condition is satisfied, a more informed analysis of the relative cost of continuing with the checkpointing and the risk associated with not completing the checkpoint can be performed, to provide a dynamic decision which better balances performance (forward progress), energy utilisation and non-volatile memory lifetime.

In general, whether the checkpoint abort condition is satisfied may depend on any function of the checkpoint progress indication and the current execution state. However, one relatively efficient way of considering both the checkpoint progress indication and the current execution state can be to use an approach where a checkpoint abort threshold amount is determined depending on the current execution state of the data processing, and whether the checkpoint abort condition is satisfied is determined depending on whether the checkpoint progress indication indicates that a completed amount of the checkpointing process is less than the checkpoint abort threshold amount. Hence, the current execution state of the data processing at the time of the interruption due to the power-loss warning event influences the selection of the threshold which can then be used as above to determine whether the amount of progress through the checkpointing process reached so far justifies either aborting or continuing with the checkpointing process. On some occasions, the threshold may be higher and so the probability of aborting the checkpointing process may be higher. On other occasions, the threshold may be lower and so the probability of aborting the checkpointing process is lower since it is less likely that the amount of checkpoint progress made is less than the threshold amount.

The checkpoint abort threshold amount may be determined based on a lookup table mapping the current execution state to the checkpoint completion threshold amount. This can allow relatively arbitrary settings for the threshold to be defined for different execution states, recognising that the relative risk of not checkpointing versus the cost of continuing checkpointing does not necessarily scale linearly through the progress through a task, and may vary depending on the relative importance of one task versus another. A lookup table (e.g. stored either in volatile or non-volatile data storage) can be looked up based on an indication of the current execution state and may return an indication of the checkpoint completion threshold amount.

A function mapping the current execution state to the checkpoint abort threshold amount (e.g. the lookup table mentioned above, or other parameters defining how the current execution state can be mapped to the threshold amount) may be obtained based on at least one of: runtime-gathered information obtained during the data processing or previous attempts to perform the checkpointing process; and profiling information obtained by code profiling of software for performing the data processing. This can provide helpful information for determining how to set the threshold.

For example, the runtime-gathered information or profiling information could comprise, for each of a number of execution points within the software executed to perform the data processing, an indication of the size of the context data to be saved to the non-volatile storage if a checkpoint was taken at that execution points, and an indication of the computational cost incurred in the data processing performed to reach that execution point. The indication of the checkpoint size could for example be obtained at runtime by counting the number of saved lines for a given instance of performing the checkpointing process, or by code profiling to analyse the size of the working set of data used at a given point of the program. The indication of computational cost could be obtained based on performance monitoring information gathered at runtime (e.g. indications of the number of instructions executed or the number of memory accesses made up to the point of the program at which the interruption happened), or by code profiling. A function could be defined to map the values of the checkpoint data size and computational cost incurred to the abort threshold to be used for a given execution point of the software.

For example, if the computational cost incurred at a given execution point is higher, the abort threshold could be lower than when the computational cost is lower, to recognise that with the higher computational cost the risk of not checkpointing is higher because it would risk a power loss event causing waste of a larger amount of processing incurred to date. On the other hand, execution points at which the amount of checkpointing data to be saved is relatively low could have a lower checkpoint abort threshold amount than execution points at which a larger amount of checkpointing data is to be saved, to reflect that the cost of continuing with checkpointing process is lower in comparison and so it may make sense to continue with checkpointing. Also, in some cases the threshold selected for a given execution point may depend not only on runtime-monitored/profiled information associated with that particular point of execution, but also on information gathered for other points of execution. For example, if it is detected for a given execution point that, although the amount of computational cost incurred to that point is high, the current volume of checkpoint state to be saved is high but will shortly be much lower with only a little extra computational cost being expended to that future point, then this could lead to a decision to provide a relatively high checkpoint abort threshold, so that it is likely that, if the processing is interrupted at that point of execution and during checkpointing the power subsequently recovers, a decision is more likely to be made to abort the checkpointing and continue execution, recognising that for a future instance of performing the checkpointing process the amount of checkpoint state to be saved is likely to be much lower.

It will be appreciated that the particular settings of the checkpoint abort threshold amount for different execution states may depend on the particular application workloads being executed, so the particular rules for setting the threshold may be highly use-case dependent.

The current execution state could be represented in a variety of ways. In general, any measure can be used which gives an indication of the point of data processing at which the processor was interrupted due to the power-loss warning event. For example, a context identifier, task identifier or thread identifier may help to distinguish between different workloads that may benefit from different decisions regarding whether or not to continue checkpointing when voltage recovers.

However, one useful measure of the current execution state can be the program counter value which is used by a processor to indicate an instruction address representing a current point of program flow reached in data processing. A value derived from the program counter value can be used to represent the current execution state, and this may be used to look up the lookup table as discussed above to obtain the corresponding threshold value. For example, the lookup table may define threshold values for different ranges of instruction addresses. The program counter value can be a useful measure of current execution state because, in a single value, it can help differentiate not only one task from another (since those task may use program code from different ranges of the address space) but also be a measure of the progress made through an individual task.

Hence, the "current execution state" may depend on one or more aspects of the state of data processing, including a dependence on which task is being performed in the data processing and/or a dependence on how much of a given task has been completed and the data processing.

In examples which consider the degree of progress within a given task as part of the current execution state, different tasks may have different relationships between the degree of progress made and the relative probability of the checkpoint abort condition being satisfied (e.g. the probability of the checkpoint abort condition being satisfied may be controlled by varying the checkpoint abort threshold amount as discussed above). Different workloads may benefit from different patterns of variation of the probability of the checkpoint abort condition being satisfied, e.g. depending on the amount of computational resource expended in those workloads and the amount of checkpoint data required to be stored.

In one example, for a task having a first point of execution and a second point of execution at which greater progress has been made than at the first point, a probability of the checkpoint abort condition being determined to be satisfied may be higher at the first point than the second point. Hence, if the task is interrupted relatively early in its execution at a point at which little progress has yet been made, then as the cost incurred in obtaining the processing results to date is relatively low, following a power recovery event it may be more likely that it is desirable to suppress checkpointing and allow processing to continue without completing the checkpointing (even if power is subsequently lost without a further checkpoint being taken, the amount of wasted work done to date would be relatively low). On the other hand, if the task is interrupted later in its execution so that a greater amount of processing resource has already been expended, the impact on performance if power was then lost and processing had to be repeated again later would be much higher, and so this may tend towards making the checkpoint abort condition less likely to be satisfied at the second point of execution than at the first point of execution.

For some tasks, the probability of the checkpoint abort condition being determined to be satisfied may decrease through the task, so that the closer the task gets to the end before being interrupted for checkpointing due to a power-loss warning event, the more likely it is that the checkpoint process would be allowed to continue even if the voltage subsequently recovers. This approach may be useful for tasks which incur a reasonable amount of computational effort, but where the amount of data that would need to be checkpointed does not reduce significantly through the progress of the task (even if the task completes), so that the risk of losing the processing results of processing already performed outweighs the cost still to be performed in maintaining a checkpoint, tilting the balance towards allowing checkpointing to continue.

However, for other tasks, it may be desirable, that for an initial portion of the task progress, the probability of the checkpoint abort condition being determined to be satisfied may decrease, but then after a certain point of execution the probability of the checkpoint abort condition being determined to be satisfied may increase again. Hence, the task may have first, second and third points of execution, where the second point of execution has made greater progress than the first point and the third point of execution has made greater progress than the second point. The probability of the checkpoint abort condition being determined to be satisfied may be higher at the first point than at the second point and higher at the third point than the second point.

This approach could be particularly useful for a task which is processing input data to generate output data, where once the output data has been generated, the input data no longer needs to be checkpointed. In this case, relatively early in the task's execution, if interrupted for checkpointing, as relatively little processing overhead has been incurred to date, the risk of losing the results of the processing and having to redo the processing later are relatively low, so the cost of continuing checkpointing (and potentially wasting a window of power availability that could be used instead for continuing with the data processing) may be considered a greater problem than the risk of losing the processing results incurred to date, tilting the balance towards being more likely to abort the checkpointing if voltage recovers before checkpointing is complete. Later, at a second point of execution nearer the middle of the task, a greater processing cost has been incurred in obtaining the results to date and so this may start to cause the balance to be tilted towards being less likely to abort checkpointing so that the forward progress made to date is not lost if power is lost. However, once the task nears the end of the task, there may be only a relatively small amount of processing left and once the task completes then the amount of data that would have to be checkpointed may be reduced, and so even though the risk of loss of useful forward progress may be relatively high, as the power has been detected to have recovered this may be predicted to give enough window of available power to finish the task, therefore meaning that if the power available drops again much less cost can be incurred in writing checkpoint data to non-volatile data storage. Therefore, closer to the end of the task it may once more be desirable to increase the probability of aborting the checkpointing process. Hence, this example illustrates that the considerations for deciding whether to abort or continue with the checkpointing process may be relatively complex and the probability of aborting may not scale linearly through the task.

The above examples also show that an approach taken for one task may not be suitable for another task given their different properties.

The relative probability of the checkpoint abort condition being determined to be satisfied may be controlled by setting the checkpoint abort threshold amount as discussed above. When the checkpoint abort threshold amount is lower, then the probability of aborting the checkpoint processing is lower since it is more likely that at the time when the power recovery event is detected the amount of checkpointing progress may have exceeded the threshold. On the other hand when the checkpoint abort threshold amount is higher, then the probability of aborting the checkpoint processing is higher because it is more likely that the checkpoint progress indication at the time when the power recovery event is detected indicates a level of progress that has not yet reached the threshold.

Another consideration for the likelihood of aborting the checkpoint process can be the relative needs of different tasks. For example, when the current execution state indicates that a current execution point is within a second task following a first task, where the second task consumes less computational resource than the first task, a probability of the checkpoint abort condition being determined to be satisfied may be lower than for at least one execution point within the first task. This may reflect that once the second task is reached, it may be desirable to avoid needing to repeat the first task following a power loss event, and so regardless of the amount of progress through the second task, a relatively low threshold for aborting checkpointing may be defined so that it is more likely that checkpointing will be allowed to continue, to increase the likelihood that a valid checkpoint can be taken which would enable the results of the first task to be preserved.

The techniques discussed above can be particularly useful in cases where the data processing is performed on an intermittent compute system. This is a system where it is expected that the availability of power may not be guaranteed and so a computing task may need to be executed intermittently over a number of separate windows of power availability interrupted by periods of power loss.

For example, this can be useful for systems powered using energy harvesting, where the power is derived from ambient energy (e.g. using a radio frequency energy harvester, solar cell, etc.). As the ambient source of energy may not always be present, the power availability cannot be guaranteed and so the checkpointing scheme can be useful to ensure that forward progress can be maintained even if power is lost from time to time.

There could also be other reasons why power is intermittent. For example, the intermittent compute system could share a power source with another higher-priority computing system which is to be prioritised for power delivery, so if the power demanded by the higher-priority system is high this may cause insufficient power to be available for the intermittent compute system.

Hence, there could be various reasons why power may be intermittently available, but in general for such systems it can be useful to design support for checkpointing in response to power loss warnings as discussed above. In such a system, if the power recovers before the checkpointing is finished, it cannot be guaranteed that the power will remain available for a long time and so completing the checkpointing process may waste part of the limited window of available power, and so this may be why it can be useful to provide the ability to abort the checkpointing process. On the other hand, always aborting checkpointing process may risk wasting progress made in checkpointing already and increase the risk that a large amount of computational load incurred to date is wasted so that it has to be repeated again later when power becomes available after power loss as there is no valid checkpoint from a sufficiently recent time point. Hence, a more dynamic approach of assessing factors, including the checkpoint progress indication and the current execution state, in deciding whether to abort or continue with checkpointing can be particularly useful for intermittent computing systems, e.g. systems powered using energy harvesting.

The power-loss warning event and the power recovery event can be detected in various ways. For example, the power supply in the device itself can be monitored, for example by monitoring voltage or current, to detect the amount of power being supplied. It can be particularly useful for a voltage monitor to be provided to monitor the supply voltage to a processing circuit and compare the voltage with certain thresholds. Hence, the power-loss warning event may be detected in response to a supply voltage dropping below a power-loss warning threshold, and the power recovery event may be detected in response to the supply voltage rising above a power recovery threshold. The power recovery threshold may be higher than the power-loss warning threshold. However, voltage monitoring is not the only approach to monitoring for the power-loss warning event and the power recovery event. It is also possible to monitor other parameters such as an amount of current supplied, or to monitor parameters indicative of the amount of ambient energy available in the environment of an energy harvester (e.g. by taking measurements of luminous intensity of solar radiation, or signal strength of radio-frequency transmissions, etc.). The power-loss warning event and power recovery event could also be detected based on a signal from the higher-priority computing system described above. Hence, in general any indication of a possible future loss of power for the intermittent computing system could be used as the power-loss warning event, and any indication that the power is recovering following a previous power-loss warning event can be used as the power recovery event.

The steps discussed above (e.g. performing the checkpointing process, evaluating whether the checkpoint abort condition is satisfied, and determining whether to abort the checkpointing process or allow it to continue) can be performed either in software or in hardware.

Hence, in one example a computer program may be provided which, when executed by a data processing apparatus, controls the data processing apparatus to perform the method of any preceding claim. The computer program may be stored on a transitory or non-transitory computer-readable storage medium. For example, this computer program could include a first routine to control the checkpointing process and a second routine to control the response to the power recovery event. For example, the first and second routines could be respective interrupt handling routines to be executed in response to interrupts representing the power-loss warning event and power recovery event respectively. Alternatively, the first and second routines could be respective functions within a single interrupt handling routine, which are selected depending on the cause of the interrupt.

In other examples, at least part of the processing discussed above may be performed by hardware circuit logic which does not require explicit software instruction execution to carry out the function.

Hence, in one example an apparatus comprises checkpointing circuitry which performs the checkpointing process in response to the power-loss warning event and control circuitry which response to detection of the power recovery event to determine whether the checkpoint abort condition is satisfied and depending on the outcome allow the checkpointing process to continue or abort the checkpointing process. For example, in some systems the checkpointing circuitry could be a direct memory access (DMA) controller or some control logic associated with a tightly coupled memory. The control circuitry could be some wakeup control logic which responds to the power recovery event by looking up information about the parameters defining the function for determining whether the checkpoint abort condition is satisfied and determining whether to interrupt the checkpointing process accordingly.

In other examples, both the checkpointing circuitry and the control circuitry could be implemented using a general purpose processor (e.g. a CPU) which executes software implementing these functions.

Specific examples will now be described with reference to the drawings.

Intermittent computing systems are systems that perform computational tasks with periodic loss of power. For example, the intermittent computing system may be powered using energy generated by an energy harvester which harvests energy from the environment. For example, a solar panel harvests energy from a light source, and when the light source is covered, the harvested energy may drop and the power to the intermittent computing system may be lost. Instead of a solar panel, the energy harvester may be an RFID energy harvester, for example. It will be appreciated that there are many examples of energy harvesters and the techniques described herein are not limited to any particular example.

Intermittent processing devices store data such as execution state associated with data processing operations in volatile data storage (also referred to as volatile memory). When power loss occurs, data (such as execution state) stored in volatile memory risks being lost, since volatile memory may guarantee retention of data only when at least a certain minimum level of power is available to maintain the stored data.

One solution to this problem is to store the execution state in non-volatile memory, which does not require a power supply to maintain data (and hence can safely store data even if a loss of power occurs, for example). However, non-volatile memory can be very expensive (e.g. in terms of latency and power consumption) to access. Hence, for rapidly changing data such as execution state, the cost of repeatedly accessing non-volatile memory to read and write execution state may be considered unacceptably high.

A compromise, which provides the advantages of using volatile memory to store execution state, while still providing some protection against data loss in the event of a loss of power, is to perform a checkpointing process.

A checkpointing process involves storing, to non-volatile memory (NVM), a snapshot of the current execution state (e.g. this could be a copy of some or all of the execution state currently stored in volatile memory). If a power loss occurs at some point, then once power is restored, data processing can resume from the point at which the checkpointing process was performed by restoring the saved execution state from the NVM.

Checkpointing can be performed periodically. However, it takes time and power to store a checkpoint to NVM, and in many cases it could be an unnecessary waste of resources to perform a checkpoint (for example, if the power level is very high and there is no risk of a loss of power). Therefore, in some intermittent processing systems, a checkpoint could instead be performed based on a live measurement of the power level supplying the processing circuitry. For example, power losses can be predicted by monitoring the voltage and making the prediction based on a live voltage reading. It will be appreciated, however, that power losses could instead be predicted by monitoring another variable (other than the voltage) indicative of the supplied power level. A power loss prediction may trigger a CPU interrupt that will cause the CPU to perform the checkpointing and go to a sleep state once checkpointing is done. Once the checkpointing process has completed, the CPU and the volatile memory can be safely shutdown until power is restored.

FIG. 1 illustrates an example intermittent computing system 2. The intermittent computing system 2 comprises an energy harvester 4, a voltage monitor 6, Power On Reset (POR) circuitry 8, a CPU (central processing unit) 10, volatile memory 11, and non-volatile memory (NVM) 12. The CPU 10 is an example of (data) processing circuitry. It will be appreciated that other types of processing circuitry could also be provided, e.g. a graphics processing unit (GPU) or neural processing unit (NPU—a type of processor with hardware designed to support machine learning processing such as neural networks). The NVM 12 could use any of a variety of memory storage technologies, e.g. flash memory, ferroelectric RAM, magnetoresistive RAM, phase change memory, etc. Hence, the NVM 12 can be any form of non-volatile storage technology that allows data to be retained even if the voltage falls below the minimum voltage required to guarantee retention of data in the volatile storage 11.

The energy harvester 4 harvests energy from the environment, and outputs an electrical signal having a voltage $V_{dd}$. The energy harvester may have some internal energy storage such as a capacitor between the directly harvested energy and the output voltage $V_{dd}$. The voltage monitor 6 receives the signal from the energy harvester and monitors the voltage $V_{dd}$. When the voltage $V_{dd}$ reaches a warning threshold the voltage monitor 6 issues a voltage warning signal (also referred to as a voltage drop indication or a power drop indication) (e.g. a Checkpointing interrupt (IRQ)) to the CPU 10. The checkpointing interrupt could be delivered to the CPU 10 either by a dedicated physical wired channel (e.g. an interrupt distribution network), or using a message-signalled interrupt (MSI) based mechanism where the voltage monitor 6 requests that a memory location is updated, with the CPU 10 monitoring that location to detect the interrupt being signalled. The voltage warning signal indicates that the power harvested by the energy harvester has reached the warning threshold value, and that if the CPU 10 is performing processing operations, then the CPU 10 should perform a checkpointing process to save a snapshot of its state of execution to the NVM 12 in case the harvested power drops below a power level below which the CPU 10 is unable to perform processing operations and execution state stored in volatile memory 11 may be lost (e.g. this could be referred to as a sleep threshold or a minimum power level; note that it may still be possible for the voltage to drop below the "minimum" value (e.g. the minimum power level need not necessarily be zero)—the term "minimum power level" in this context refers to a power level below which some or all of the functions of the CPU 10 and/or other hardware within the intermittent computing apparatus 2 can no longer be performed). Therefore, in response to the voltage warning signal, the CPU 10 stores a snapshot of its state of execution to the NVM 12. The POR circuitry 8 also receives the signal from the energy harvester and monitors the voltage $V_{dd}$. When the $V_{dd}$ reaches a POR threshold, the POR circuitry 8 issues a reset signal to the CPU 10. The reset signal indicates that the voltage has reached a POR threshold, at which there may be sufficient power to restore checkpoint state and continue processing. The CPU 10 restarts processing in response to the reset signal.

Figure 2:
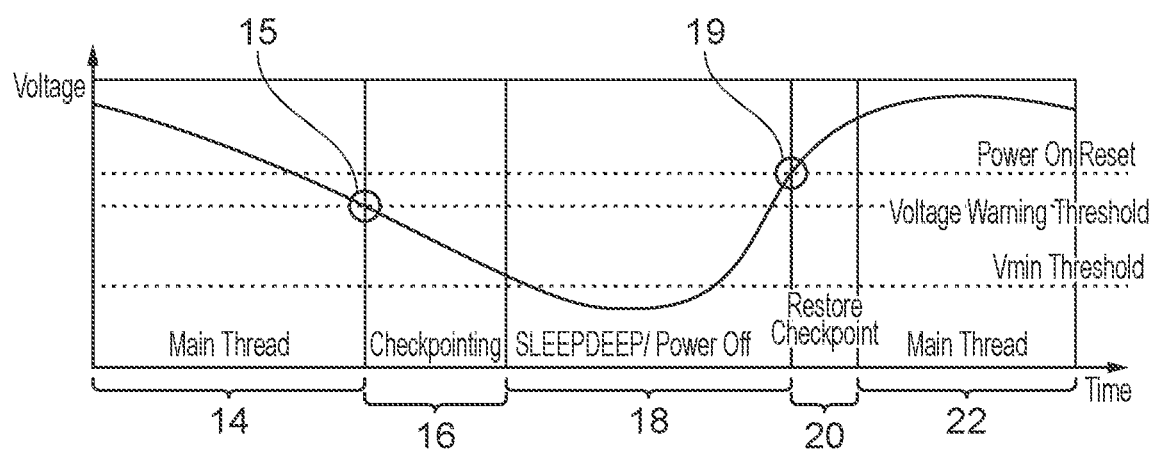
FIG. 2 illustrates an example of checkpoint saving and restoration.

FIG. 2 illustrates an example power cycle sequence for an intermittent computing system employing dynamic checkpointing. At stage 14, the voltage of the energy harvester output is above the voltage warning threshold. Therefore, at stage 14 the CPU 10 is performing processing operations normally. At stage 15 the voltage has fallen to the voltage warning threshold value. Hence, at stage 15 the voltage monitor 6 issues a voltage warning signal to the CPU 10. Following receiving of the voltage warning signal, at stage 16 the CPU 10 interrupts the main thread of processing being performed at 14, and switches to performing a checkpoint process which saves execution state (e.g. register state and context data in memory) to the NVM 12. Once the CPU 10 has completed the checkpoint process, at stage 18 the CPU goes into a sleep state in which processing operations are not performed. The harvested voltage may drop below the minimum voltage ($V_{min}$) below which the CPU 10 is unable to perform processing operations and volatile memory 11 associated with the CPU 10 may lose any stored information. However, the NVM 12 does not require power to store information and therefore any information stored in the NVM will be retained even if the voltage falls below $V_{min}$. At stage 19, the voltage has increased and reaches the reset voltage. Therefore, at stage 19 the power on reset circuitry 8 issues a reset signal to the CPU 10. After receiving the reset signal, at stage 20 the CPU 10 restores, from the NVM 12, the execution state that was stored at stage 16. By restoring execution state from the NVM, the state stored in volatile memory 11 that was lost when the voltage dropped below $V_{min}$ is restored and processing can continue. Therefore, at stage 22 the CPU 10 performs processing operations normally. By performing such a checkpointing process, progress made by the CPU 10 is not lost when voltage drops below $V_{min}$ and therefore forward computational progress can be maintained.

Note that from the power sequence diagram shown in FIG. 2 the voltage warning threshold is lower than the POR threshold. At the voltage warning threshold, the CPU only needs enough energy to complete a checkpointing routine. After POR, the CPU is also expected to do a checkpoint restoration and some useful work in the main thread, hence the different levels.

On some occasions, during the checkpointing stage 16, the power level may recover due to the energy harvester being able to generate more energy. In this case, the CPU 10 has not been to sleep or lost power, and processing may be able to resume without restoring execution state from the NVM. Given that the CPU does not need enough energy to do a checkpoint restoration, the processing can resume from a lower power level ("Voltage OK") than the POR threshold.

Figure 3:
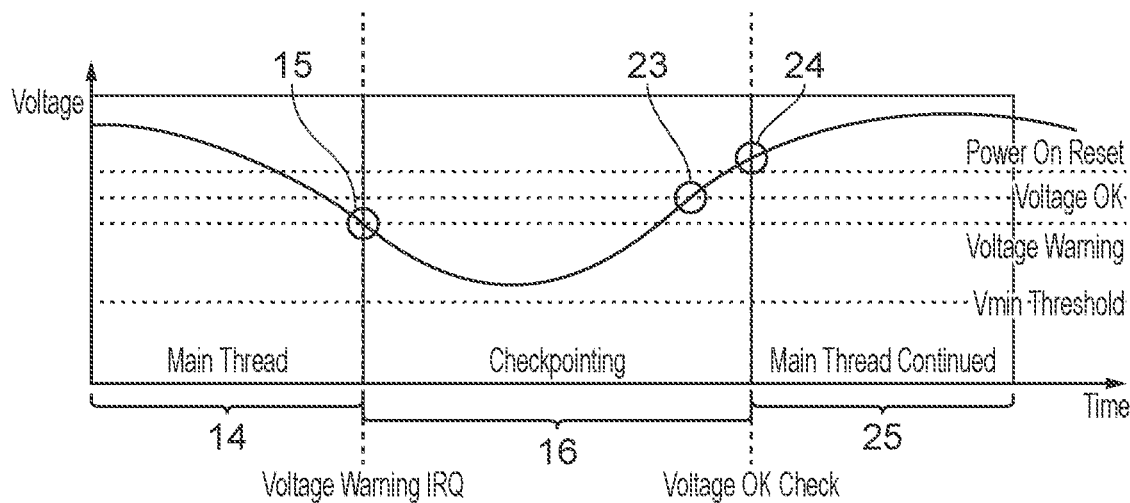
FIG. 3 illustrates an example where a power recovery event occurs while the checkpointing process is still in progress.

FIG. 3 illustrates a power cycle sequence when the power level recovers during checkpointing. At stage 14 the voltage of the energy harvester output is above the voltage warning threshold and the CPU 10 performs processing operations normally. At stage 15 the voltage reaches the voltage warning threshold value, the voltage monitor 6 issues a voltage warning signal to the CPU 10, and the CPU 10 begins checkpointing. During the checkpointing stage 16, at stage 23 the voltage reaches a voltage OK threshold. At this point, the voltage monitor 6 issues a voltage OK signal to the CPU 10 to indicate that processing may restart. Due to interrupt handling latencies, there may be a lag between the voltage passing the voltage OK threshold and the CPU 10 resuming the main thread of processing at stage 24. At stage 25 the CPU 10 continues processing the main thread without going to sleep or performing a checkpoint restoration routine.

Figure 4:
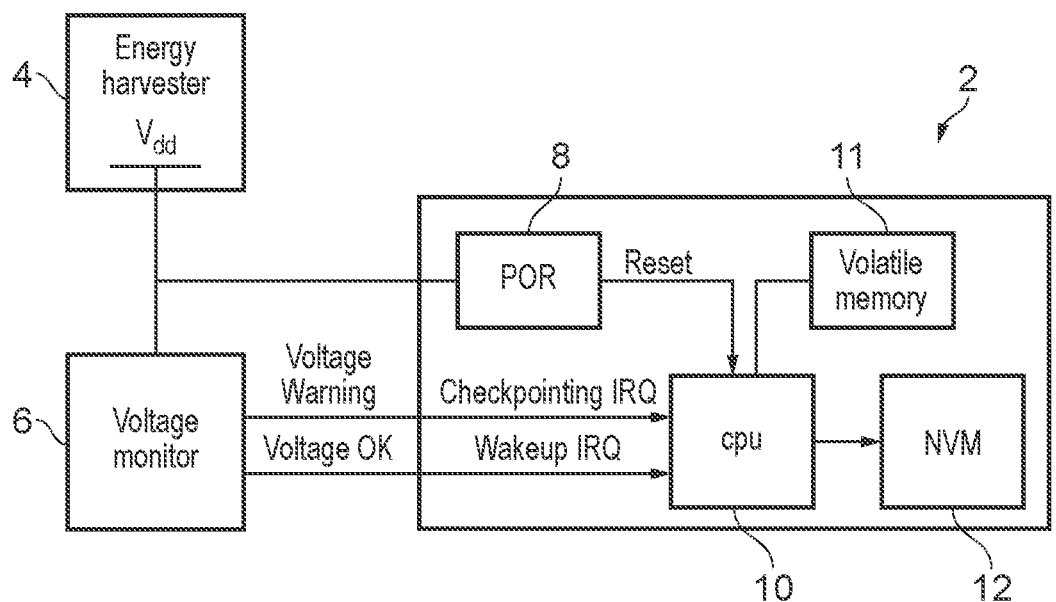
FIG. 4 illustrates signalling of the power recovery event to processing circuitry.

FIG. 4 illustrates the example intermittent computing system 2 shown in FIG. 1 adapted to resume processing without sleeping after the voltage reaches the voltage OK threshold. In addition to issuing the voltage warning signal when the voltage reaches a voltage warning threshold, the voltage monitor 6 also issues a voltage OK signal (wakeup interrupt) to the CPU 10 when the voltage reaches a voltage OK threshold. The voltage OK signal indicates that the CPU 10 can resume processing without going to sleep or performing a checkpoint restoration. It will be appreciated that the particular values of detected voltage at which the voltage warning signal, the POR signal and the voltage OK signal are issued may depend on a number of factors specific to a particular implementation.

Hence, as shown in FIG. 3, sometimes the power-loss prediction (represented in this example by the voltage dropping below the voltage warning threshold) may be a false positive and there may not actually be a subsequent loss of power. The examples below describe a method to determine whether, if the power recovers after a checkpoint starts, a) checkpointing should proceed and finish or b) checkpointing should be interrupted and processing execution resumed.

The proposed mechanism enables a decision (dynamically, based on the checkpointing status, and also on current execution state) whether it is worth to save and checkpoint the current information or whether it is best to abandon the checkpoint and resume computing. Being a workload dependent situation (dependent on the characteristics of the sensed data being processed, the processing pipeline, and the environment energy-source characteristics), the method provides elements (either software or hardware assisted) to decide what to do in each situation.

Figure 5:
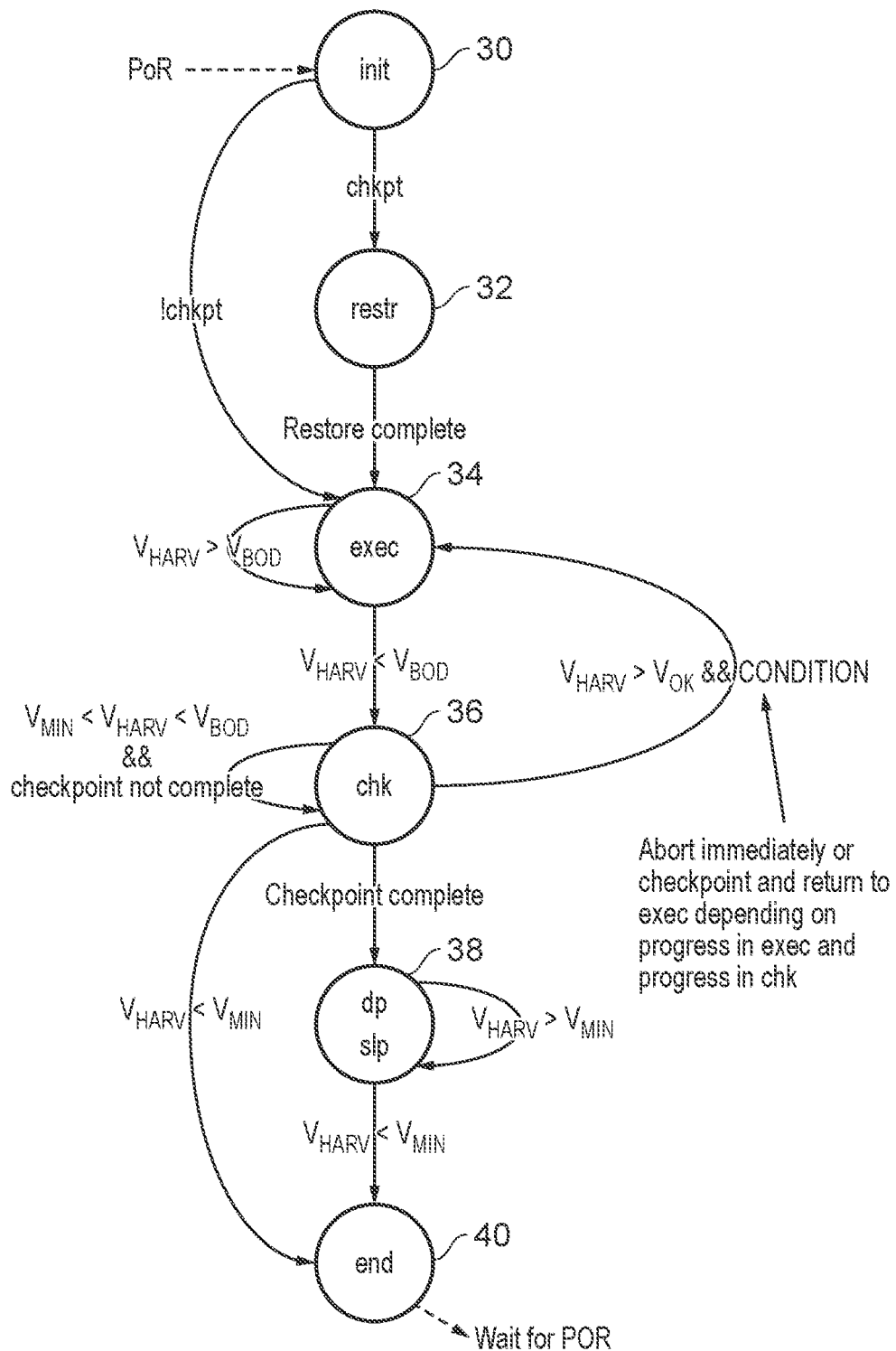
FIG. 5 is a state diagram illustrating state transitions of the intermittent compute system depending on monitoring of voltage.

FIG. 5 is a state diagram illustrating a control model for the intermittent compute system 2. The diagram illustrates various states of the intermittent compute system 2 and the conditions that cause corresponding state transitions to be performed. In FIG. 5, the voltage $V_{HARV}$ corresponds to $V_{dd}$ in FIG. 1. The thresholds $V_{BOD}$, $V_{OK}$, $V_{MIN}$ shown in FIG. 5 correspond respectively to the voltage warning threshold, voltage ok threshold and Vmin threshold shown in FIG. 3.

When a power on reset event occurs, the system starts in an initial state 30. If a valid checkpoint of previous context information is available, then the system transitions to a restore state 32 during which the checkpoint is restored by copying the checkpoint data from the non-volatile memory 12 to the volatile memory 11 and registers of the CPU 10. The restoration of checkpoint data can be performed either in software (using a checkpoint restoration routine executed on the CPU 10) or with hardware assistance (for example, the CPU 10 may configure a direct-memory-access (DMA) engine to carry out the transfers to write the checkpoint data read from non-volatile memory 12 to the volatile memory 11). Once checkpoint restoration is complete, the system transitions to the execute state 34 in which execution of the thread of processing corresponding to the restored context information can resume. If no valid checkpoint was available in non-volatile memory 12, then the transition occurs from the initial state 30 to the execute state 34, bypassing the restore state 32, and in this case a thread of processing starts from its beginning without resuming based on restored context.

While the supply voltage $V_{HARV}$ provided based on energy harvested by the energy harvester 4 (including not only the energy directly harvested by the harvester at a given time, but also previously harvested energy stored as charge in a capacitor, or in a battery or another energy storage device) remains above a brownout detection threshold voltage $V_{BOD}$, the system remains in the execute state 34 and execution of the thread of processing continues. The brownout detection threshold voltage $V_{BOD}$ is set at a level above the minimum voltage $V_{MIN}$ at which processing can be sustained in the execute state 34, with the margin between $V_{BOD}$ and $V_{MIN}$ being set so that there is predicted to be sufficient time, between the voltage dropping below $V_{BOD}$ and the voltage reaching $V_{M}IN$, for a checkpoint of execution state to be saved to non-volatile memory 12. Hence, the voltage dropping below $V_{BOD}$ can be seen as a power-loss warning event serving as a prediction that a power-loss event may occur in the near future. Other implementations may use a different method of detecting the power-loss warning event, such as detecting parameters which indicate current ambient conditions relevant to harvesting of energy by the energy harvester (e.g. signal strength of ambient radio frequency radiation, luminous intensity of solar radiation, etc.), or detecting an indication that another system competing for power delivery will draw a large amount of power risking insufficient power for the intermittent compute system 2. Hence, a prediction of possible future power loss can be based on factors other than voltage.

When a power-loss warning event occurs (in this example, detected based on the supply voltage $V_{HARV}$ dropping below $V_{BOD}$), the system transitions to a checkpointing state 36 in which a checkpoint is taken, to store a snapshot of context information representing the state of the data processing to the non-volatile memory 12. Similar to the checkpoint restoration, the checkpoint saving operations can be performed either in software or with hardware assistance from a DMA engine or similar hardware component which can perform the memory operations to transfer data from volatile to non-volatile memory. While the supply voltage $V_{HARV}$ remains between $V_{BOD}$ and $V_{MIN}$ and the checkpointing is not yet complete, the system remains in the checkpointing state 36.

If, while checkpointing is still in progress in the checkpointing state 36, a power recovery event is detected (in this case, based on the supply voltage $V_{HARV}$ recovering to rise above a wakeup voltage threshold $V_{OK}$, but in other examples the power recovery event could be detected based on other information such as the ambient environmental conditions or signal from a competing consumer of power as discussed above), then it is determined whether a checkpoint abort condition is satisfied. If the power recovery event is detected while checkpointing is still in progress and the abort condition is satisfied, then the system returns to the execute state 34 without completing the checkpoint and without restoring a saved checkpoint. At this point, the context information associated with the thread previously executed in the execute state 34 will still be stored in the volatile memory 11 and so processing can resume in the execution state. On the other hand, if the power recovery event is detected, but the checkpoint abort condition is not satisfied, then the system remains in the checkpointing state 36 and continues with the checkpointing process to save the checkpoint data to non-volatile memory 12. The checkpoint abort condition can be evaluated based on the data processing progress made to date in the data processing being performed in the execute state 34 before the checkpointing interrupted the processing, and on the checkpoint progress made in the checkpointing process while in the checkpointing state 36. The decision on whether to abort the checkpointing or not can be a workload-dependent situation and the best option may vary from one processing workload to another, as indicated in the examples discussed below.

When the checkpointing process is complete, the system transitions from the checkpointing state 36 to a sleep state (deep sleep, or dp slp) 38, in which the CPU 10 is inactive and can be placed in a power saving state (e.g. by power gating) to save energy.

If, while in either the checkpointing state 36 or the sleep state 38, the supply voltage $V_{HARV}$ drops below $V_{MIN}$ (i.e. a power loss event occurs), then the system transitions to a power loss (end) state 40 and it is assumed that any information in the volatile memory 11 (as well as any storage within the CPU 10 such as registers and caches) is unreliable. The system would then wait until a power on reset event occurs to restart the system in the initial state 30. If the power loss event occurs while the system is in the checkpointing state 36 then the checkpoint which was in progress of being saved may be corrupted and so cannot be relied upon when subsequently restoring from the initial state 30. To allow valid and corrupted checkpoints to be distinguished, one approach can be that at the completion of the checkpoint process, a checkpoint complete marker is saved to the non-volatile memory and so checkpoints which are not associated with the checkpoint complete marker can be considered invalid.

Figure 6:
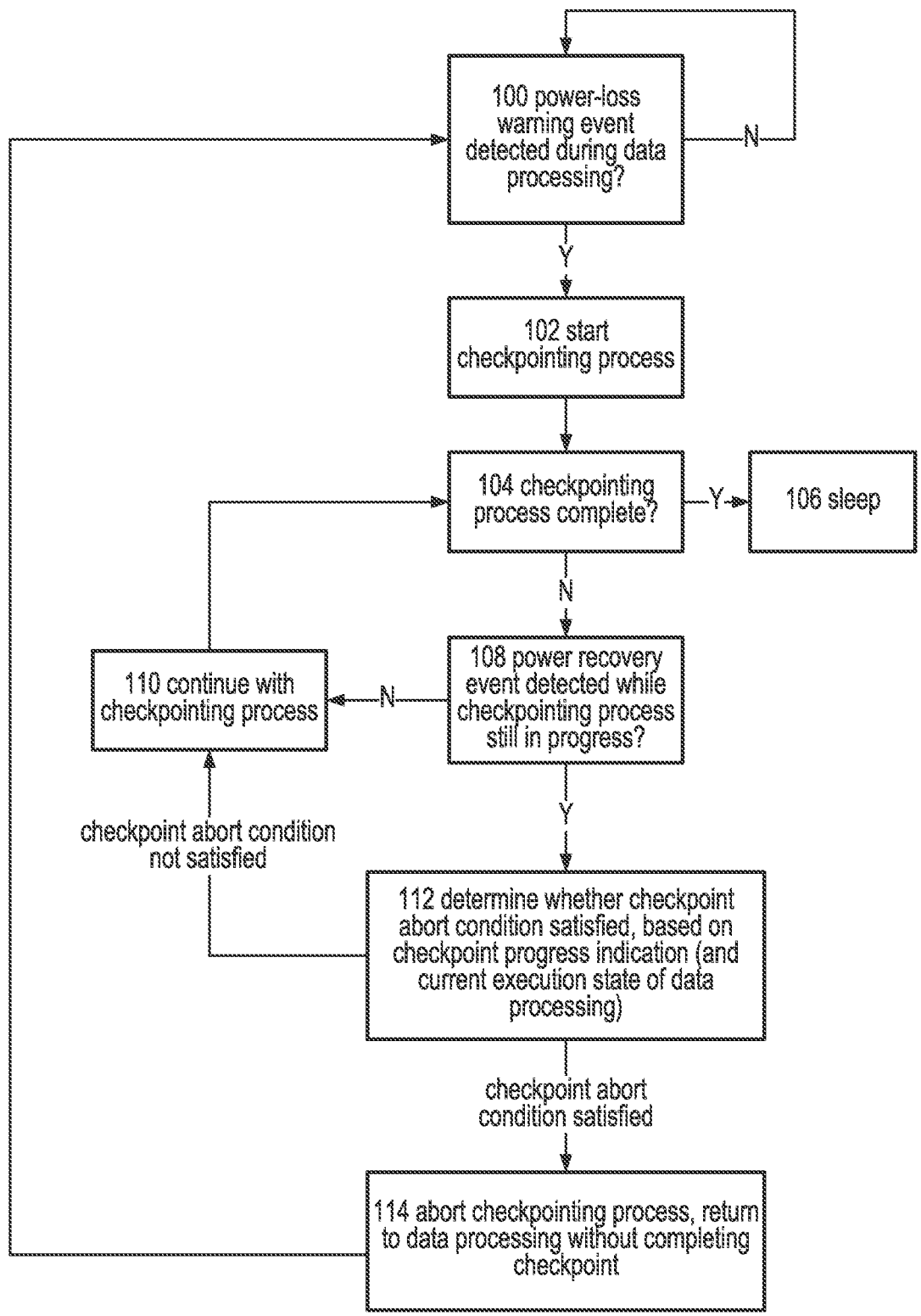
FIG. 6 is a flow diagram illustrating a method of controlling checkpointing.

FIG. 6 is a flow diagram illustrating a method for an intermittent computing system 2. At step 100, it is detected whether a power-loss warning event has occurred during data processing. For example, the power-loss warning event can be detected by the CPU 10 based on receipt of a checkpointing interrupt signalled by the voltage monitor 6 in response to detecting that the supply voltage $V_{HARV}$ has dropped below a brownout detection threshold voltage $V_{BOD}$. In response to detecting the power-loss warning event, the data processing being performed on the processor 10 is interrupted and at step 102 a checkpointing process is started. For example, an interrupt handling routine may cause the checkpointing process to be performed by software, with the software executing load/store instructions to transfer the checkpoint data from volatile memory 11 to non-volatile memory 10. Alternatively, the software could set configuration data stored in memory which may configure a hardware element, such as a DMA controller or tightly coupled memory (as described further with respect to FIG. 8) to carry out the data transfers of checkpoint state from volatile memory 11 to non-volatile memory 10. Also, the current contents of registers of the CPU 10 may be saved to non-volatile memory 10 (e.g. with a prescribed format mapping the data from each architectural register to addresses of a data structure in memory so that it is known on checkpoint restoration which data in memory relates to each architectural register).

If at step 104 the checkpointing process has completed, then at step 106 the system transitions to a sleep state in which no active processing is performed by the CPU to save energy. Subsequently, it is possible that power may be lost. If power is subsequently restored then the system would start again in the initial state 30 as shown above in FIG. 5.

Otherwise, at step 108 it is detected whether a power recovery event has been detected while the checkpointing process is still in progress. For example, the CPU 10 can detect the power recovery event based on a wakeup interrupt sent by the voltage monitor 6 in response to detecting that the supply voltage $V_{HARV}$ has risen above a power recovery threshold voltage $V_{OK}$. To allow the wakeup interrupt to pre-empt the interrupt that caused the checkpointing process to be performed, the wakeup interrupt may be assigned a higher priority than the checkpointing interrupt. If the power recovery event is not detected, then at step 110 the checkpointing process continues. Hence, steps 104, 108, 110 continue until either the checkpointing process is complete, power is lost without checkpointing being complete (in which case the checkpoint will be corrupted), or the power recovery event is detected.

If the power recovery event is detected then at step 112, a software routine executing on the CPU 10 (or some hardware circuit logic in some implementations) determines whether the checkpoint abort condition is satisfied. Whether the checkpoint abort condition is satisfied is determined based on a checkpoint progress indication representing progress of the checkpointing process so far (e.g. an indication of a completed amount of the checkpointing process and/or a remaining amount of the checkpointing process still to be performed), and may also depend on the current execution state of the data processing which was interrupted to start the checkpointing process. If the checkpoint abort condition is not satisfied, then at step 110 checkpointing process continues. If the checkpoint abort condition is satisfied then at step 114 the checkpointing process is aborted and the CPU 10 returns to data processing without completing the checkpoint.

The evaluation of the checkpoint abort condition can be implemented in various ways.

In one implementation, checkpointing is triggered by an interrupt and performed by the checkpointing routine that copies the required data from RAM to the NVM. As the checkpointing routine can know how much information during checkpointing is left to save to NVM, the decision can be made based on certain thresholds provided by the user—for example: abort the checkpointing if less than 20% of the checkpoint data has been written when the voltage-restored interrupt is raised.

$$\text{ABORT CONDITION} = f(\text{threshold}, \text{checkpoint\_state})$$

A more complex implementation may also consider the current execution state of the processor (e.g. what task was being executed, and the amount of progress made in that task). For example, the checkpoint abort condition can be computed as $$\text{Checkpoint abort threshold} = g(\text{execution\_state})$$

$$\text{ABORT CONDITION} = f(\text{threshold}, \text{checkpoint\_state})$$

(e.g. in both examples f( ) may be true if checkpoint_state indicates an amount of progress less than the threshold amount).

In the second example, we can see how the threshold now is not fixed, and depends on the state of the execution—it can be different for one task compared to another and can be different at different points of execution within a single task.

In some examples, the information on current execution state could be maintained by software (e.g. a task identifier indicating which task is executing, and/or a task progress indicator indicating which stage of a number of stages of task execution has been reached). These can then be looked up in a look up table stored in volatile/non-volatile storage to determine the checkpoint abort threshold which is compared with the checkpoint progress indication (checkpoint_state) to determine whether the checkpoint abort condition is satisfied.

Figure 7:
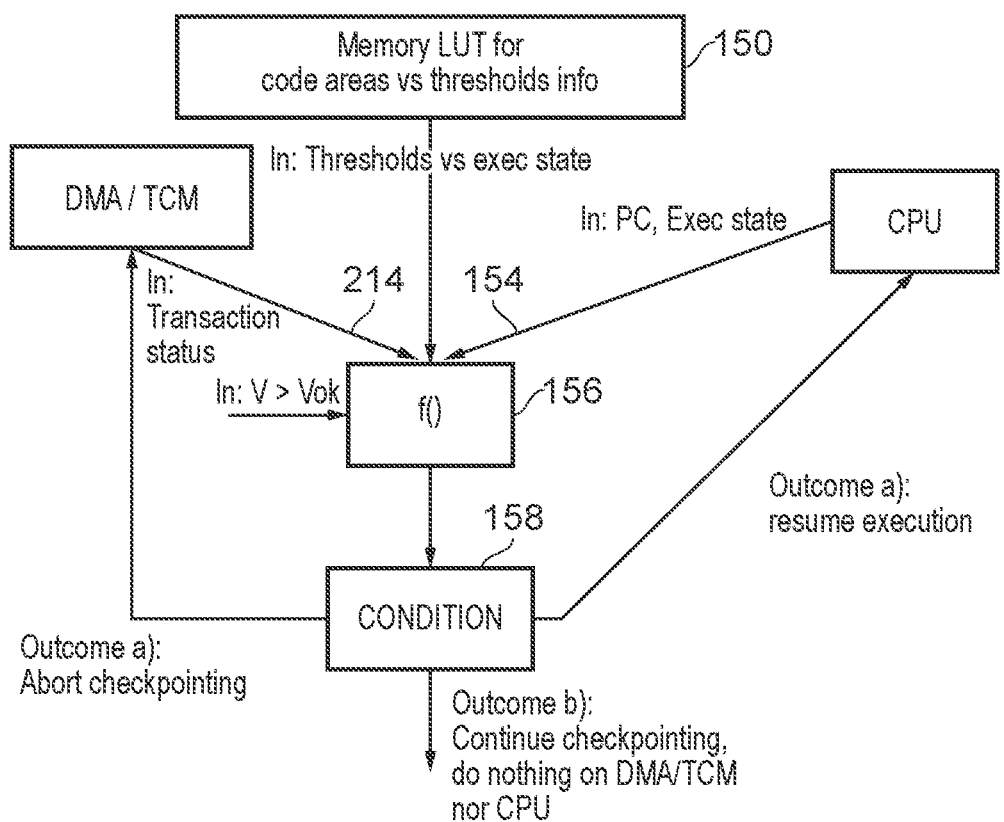
FIG. 7 illustrates evaluation of whether a checkpoint abort condition is satisfied based on a checkpoint progress indication and an indication of the current execution state of data processing.
Figure 8:
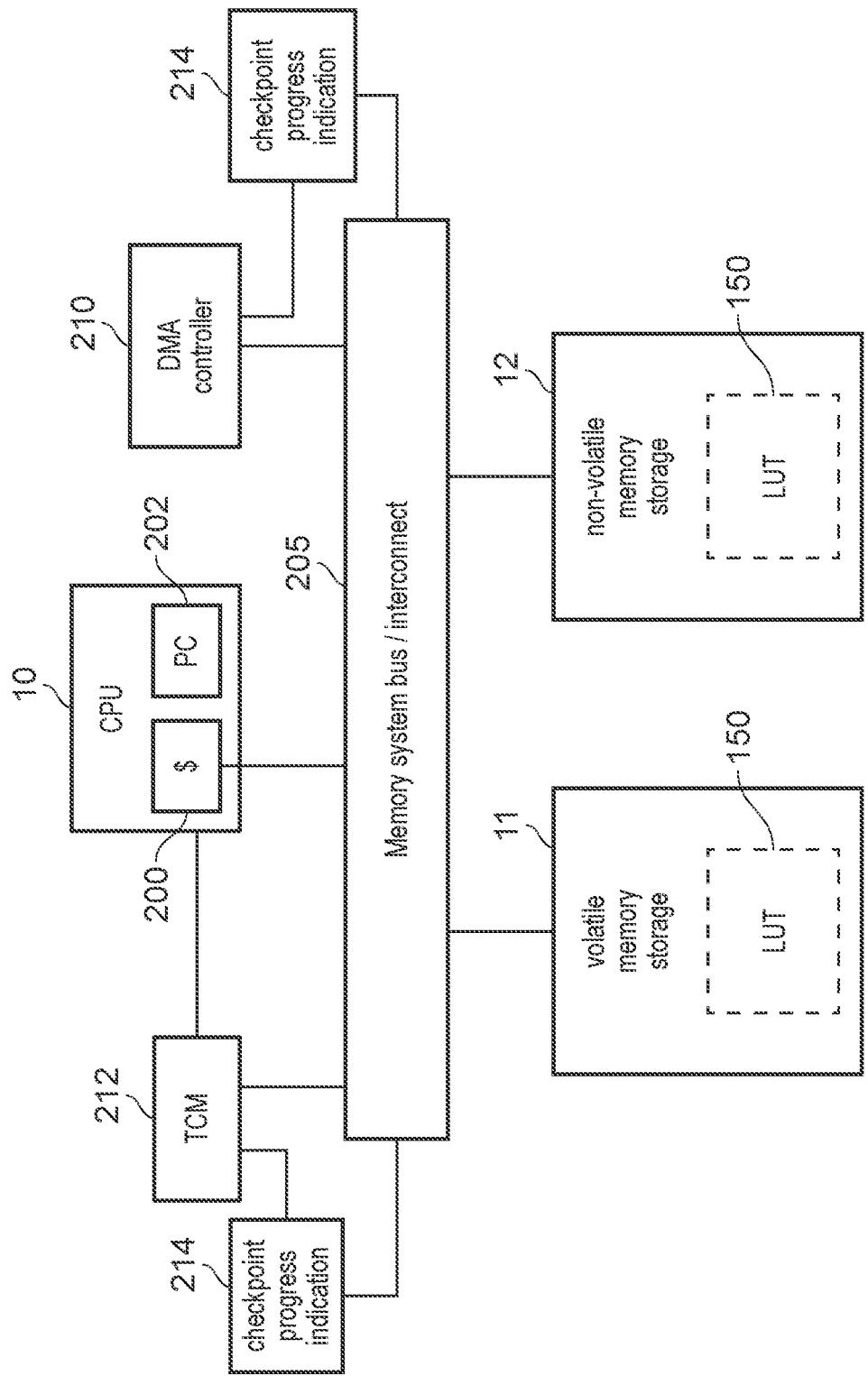
FIG. 8 illustrates an example of hardware-assisted maintenance of the checkpoint progress indication and current execution state indication.

A more complex yet more powerful implementation targets systems where the checkpointing stage is assisted by specific hardware, like a DMA or a tightly coupled memory (TCM), as shown in FIGS. 7 and 8. FIG. 7 illustrates functionally the decision flow for evaluating the checkpoint abort condition and FIG. 8 illustrates a possible hardware architecture for the intermittent compute system 2. As shown in FIG. 8, the CPU 10 (which has its internal cache(s) 200, and a program counter register 202 storing an instruction address representing the current point of program execution) may access the volatile memory 11 and non-volatile memory 12 via a memory system bus or interconnect 205 and may share access to the memory system with one or more other hardware units. For example, these hardware units may include a DMA controller 210 for controlling direct memory access operations (memory access operations performed in the background of operations performed at the CPU 10, based on configuration data previously set by the CPU 10). The hardware units could also include a tightly coupled memory (TCM) 212, which is a local memory which can be accessed by the CPU 10 faster than the volatile memory 11 and non-volatile memory 12, similar to the latency seen by the cache 200, but where the TCM 212, unlike the cache 200, does not implement a cache replacement policy (e.g. based on recency of access) and so information allocated to the TCM 212 by the software executing on the CPU 10 will remain in the TCM 212 until either power is lost, or the data is requested to be removed/replaced in the TCM 212 by the software.

Hence, in some implementations, rather than software having to explicitly request each data transfer used to save checkpointed context data to the non-volatile memory storage 12, the DMA controller 210 or the TCM 212 may have a hardware interface which can be configured by the CPU 10 to transfer the context data automatically. For example, the hardware interface may implement a state machine which may iterate to save information from a previously configured range of addresses to the non-volatile memory storage 12. Hence, the hardware interface may maintain the checkpoint progress indication 214 which tracks the progress of the checkpointing process. For example the checkpoint progress indication 214 may indicate the number of cache lines saved to non-volatile memory storage 12 so far, the number of cache lines still remaining to be saved to non-volatile memory storage 12, or any other indication that represents the progress of checkpointing (e.g. an indication of a fraction of the checkpointing process that is completed or remaining, or a size of the data for which transfer is complete/remaining). The storage location storing the checkpoint progress indication 214 is software-readable (e.g. it can be a register which is memory-mapped so that the CPU 10 can read it by issuing a memory read request specifying the address of the register, or alternatively the hardware of the TCM 212 or DMA controller 210 may store the checkpoint progress indication 214 to a prescribed address in the volatile random access memory 11 directly).

Hence, as shown in FIG. 7, the software evaluating the checkpoint abort condition may take as inputs several pieces of information, including:

a checkpoint progress indication 214 provided in the software-readable location by the hardware (e.g. DMA controller 210 or TCM 212);

an indication of the current execution state 154 of the CPU. For example, this could simply be the current program counter value maintained in the program counter register 202 by the CPU 10. The program counter can be a useful measure of current execution state since it may distinguish not only progress within a single task but also one task for another, since those tasks may have their instructions stored at different address ranges.

A lookup table (LUT) 150 stored in volatile or non-volatile memory, which maps the program counter or other execution state indication to a corresponding checkpoint abort threshold value. For example, the lookup table 150 may have entries corresponding to certain program counter address ranges, and so a lookup to select a LUT entry based on the program counter may return the corresponding checkpoint abort threshold value.

The checkpoint abort function f( ) 156 is then evaluated based on these inputs, to obtain the checkpoint abort threshold selected based on current execution state and then compare the checkpoint progress indication with the threshold to determine whether the checkpoint abort condition 158 is satisfied. These steps can be performed in software.

Some examples use cases are set out below. It will be appreciated that these are just some examples and other workloads may use a different model to evaluate the checkpoint abort condition.

Figure 9:
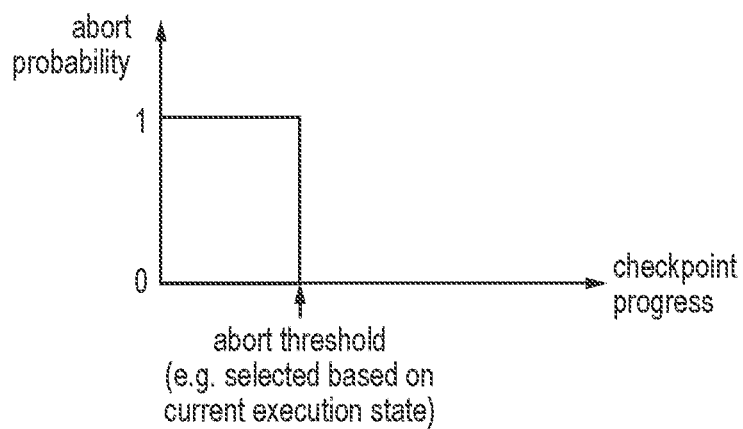
FIG. 9 illustrates an example of determining whether the checkpoint abort condition is satisfied depending on the checkpoint progress indication and a checkpoint abort threshold.

FIG. 9 shows a first example where the checkpoint abort condition depends on the checkpoint progress indication. Over the computation of a task, a voltage warning is raised, stopping the normal execution and triggering the checkpointing process (either a software checkpointing routine or a hardware-enabled process such as DMA/TCM based as described earlier). After a brief period of time, the voltage levels recover. Two scenarios can be envisaged:

Scenario A) The checkpointing stage barely started, and we still have most of the data to be saved yet to be transferred to the NVM—e.g. 95%. Given that the energy conditions are favourable, the system detects that this 95% NVM transactions would be very expensive, and thus aborts the checkpointing and resumes the normal execution. Writing to an NVM during a checkpointing is expensive in terms of power and time, and thus unnecessary writes can be avoided to save energy, allowing the limited window of sufficient power to be used for actual data processing instead of checkpointing. Also, because NVMs suffer from endurance problems, limiting the number of checkpoints increases the system lifetime.

Scenario B) The checkpointing stage is about to finish, e.g. we are 90% through saving the data to the NVM. Discarding the checkpointing and resuming the execution would mean that we would have wasted 90% of the energy that it takes to perform a checkpointing. The risk/cost ratio of discarding what has been saved and require to write it again in a future brownout versus finishing this 10% invites to finish the checkpoint, and later, resume the normal execution.

Hence, in the approach shown in FIG. 9, the abort probability is 1 when the checkpoint progress is less than abort threshold (e.g. 20% of checkpoint progress, say) and is 0 when the checkpoint progress is greater than this threshold.

Figure 10:
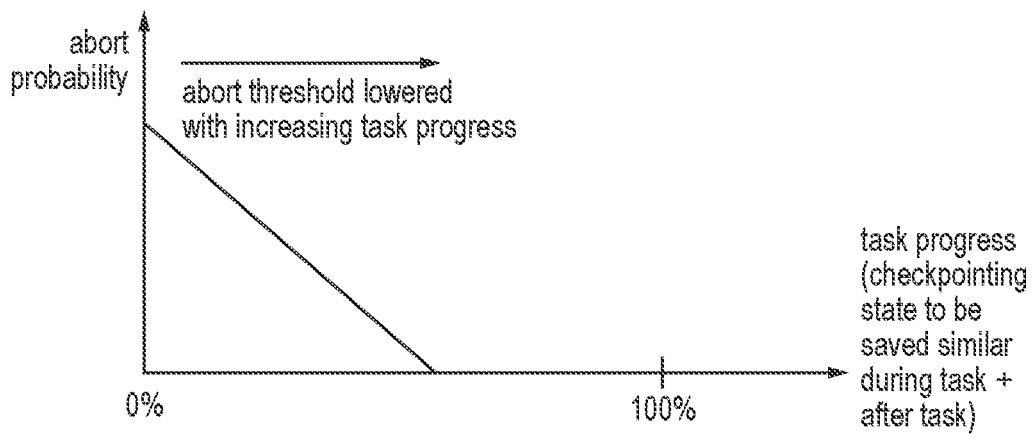
FIGS. 10 to 12 illustrates three examples of variation of probability of the checkpoint abort condition being satisfied depending on the current execution state of the data processing.

FIG. 10 shows another approach which may consider the amount of task progress reached at the current execution state of the data processing being performed before it was interrupted for checkpointing. In an initial part of the task, the checkpoint abort threshold is gradually decreased with increasing task progress until eventually it is lowered to 0. By lowering the threshold, the probability of checkpointing process being aborted (if the power recovers at a given fraction of completion of the checkpointing process) also decreases (since it is less likely that at the time of the power recovering, the completed fraction of checkpointing will be less than the threshold). Hence, the abort probability gradually decreases to 0. Above a certain amount of task progress, the abort probability may be zero so that if more than a certain amount of the task has been completed then the checkpoints process would continue even if a power recovery event occurs. While FIG. 10 shows a linear decrease in abort probability, in practice a stepped approach may be taken where respective ranges of program counter values are associated with successive decreasing probabilities of aborting the checkpoint process if the checkpoint started at that point of the task progress but the power subsequently recovers before the checkpointing is complete.

The approach shown in FIG. 10 can be useful for tasks where the amount of checkpointing state to be saved is similar both during the task and after the task is completed (e.g. the task may generate output data of a similar data volume to the input data being processed or intermediate state processed during the task). In this case, relatively early in the task's progress, the amount of computation that would be wasted and have to be re-performed if power is lost without saving a checkpoint is relatively low and so the risk of not completing checkpointing also is relatively low, so that a higher abort threshold can be defined which would increase the likelihood that, on detecting the power recovery event, the amount of checkpoint progress is less than the threshold causing abort. By not completing the checkpoint, the energy and wearout cost of writing to NVM can be avoided. However, as the task progress continues, the risk of not checkpointing becomes higher because the amount of computation that would be wasted is greater and so the abort probability is gradually decreased by lowering the abort threshold.

Figure 11:
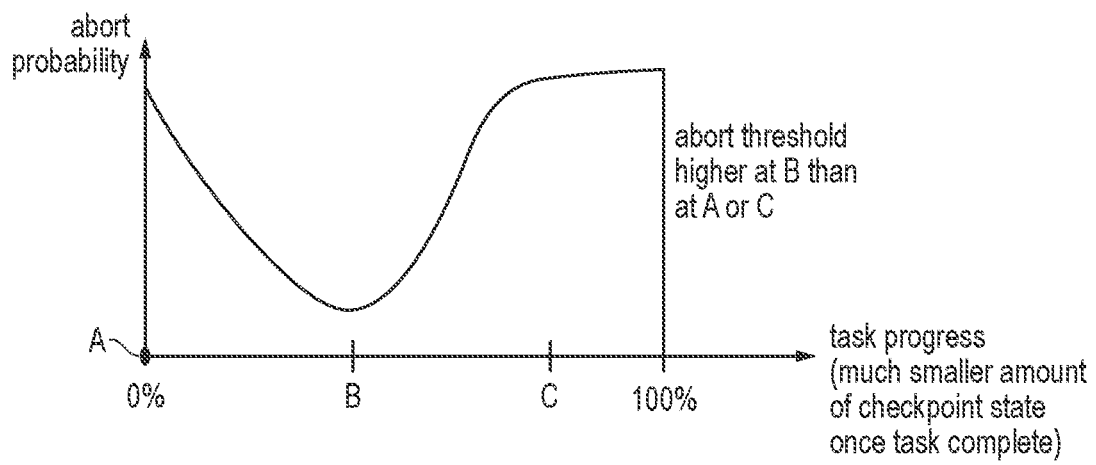

FIG. 11 shows another example which can be used for a task where, once the task completes, the amount of data that would need to be checkpointed is much smaller than while the task is in progress. For example, the task could be a relatively computationally expensive task, such as a digital signal processing task such as a Fast Fourier Transform (FFT) and Discrete Cosine Transform (DCT). The memory size of the working set of data for the FFT is likely to be huge, much larger than its outputs (e.g. once the output is available, the inputs and some intermediate state calculated during the task could be discarded). Therefore, the cost/risk analysis provides different outcomes, at different points of execution A, B, C shown in FIG. 11, for whether to abort or continue checkpointing if a power recovery event occurs while checkpointing is in progress. The probability of aborting depends on the amount of progress reached in the task before it was interrupted to perform the checkpointing:

a. The task has just started (e.g. not fully finished acquiring the input data). In this case, the benefit of saving the incoming sensory data may be very low, as the incoming data may change by the time the checkpointing finishes creating a 'gap' in the FFT time axis. In any case, the amount of computation that is wasted if it had to be redone is very low. Therefore, it may be useful for the checkpointing process to abort if the task progress is very low, to avoid incurring the energy/wearout cost of a checkpoint of little value.

b. The task is around halfway computed (with data acquisition finished). In this case the risk of losing a lot of information that took a lot of compute cycles to calculate may compensate finishing the checkpointing. Therefore, the checkpoint is more likely to continue (the abort probability is lower).

c. The task is about to finish. One might naively expect it is desirable to continue checkpointing to guard against loss of a considerable amount of processing carried out to date.

However, as the task is near the end, with just a few more compute cycles, the whole task will finish and the memory requirements will decrease. In this case completing the checkpoint is less preferred (e.g. the energy and time cost of saving to NVM for the checkpointing may be greater than the energy and time cost of completing the task), and so it can be preferred to abort the checkpointing and allow the CPU 10 to directly resume the task without checkpoint restoration. If another power-loss warning event occurs after the task is complete, the cost of performing the checkpoint again at that point is expected to be much lower. After the task completes, the abort probability may drop to 0 as it is now desirable to allow any checkpointing to continue to ensure the overhead of the computations already performed for the task are not lost if a power failure arises. For example, if the processor has gone to sleep after the task completed, if a power loss warning occurs, checkpointing may start and may continue even if power subsequently recovers without losing power, because as the processor was asleep at the time of the power loss warning, there is no processing to resume and so it is preferred to continue the checkpointing to ensure the results of the previous task are saved to NVM and so any previously incurred processing overhead is not wasted if power is subsequently lost.

Figure 12:
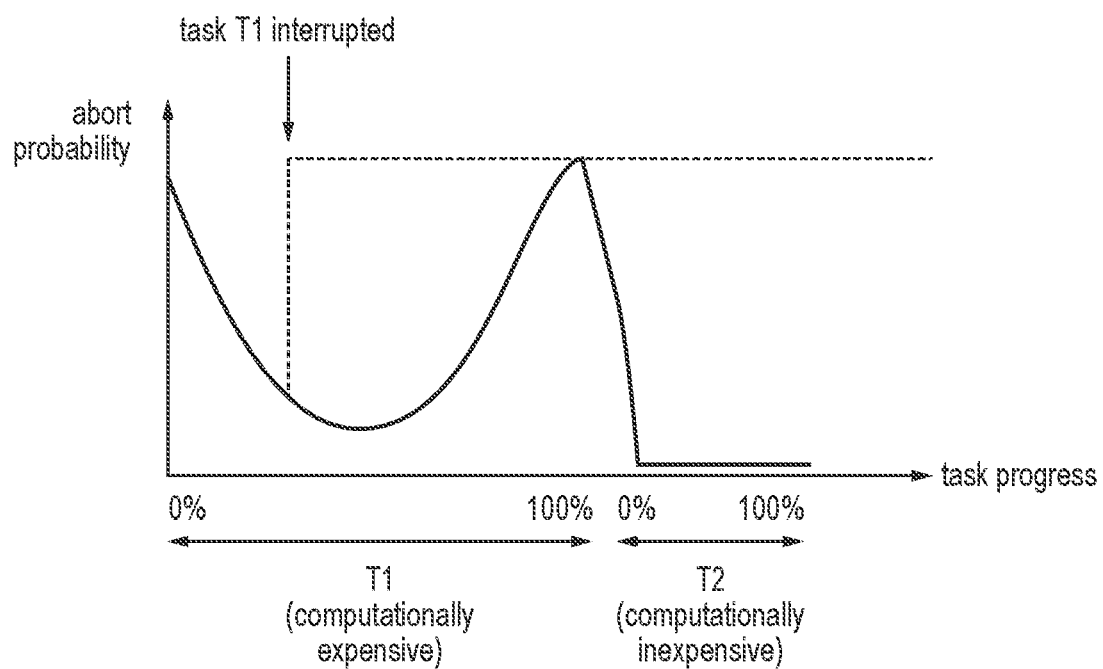

FIG. 12 illustrates a further example where the checkpoint abort threshold may be set for one task T2 with awareness of which other task T1 is executed before it. For example, consider the computation of two sequential tasks (T1, T2) such that in the normal execution of the workload we find the T1-T2-T1-T2 . . . pattern. T1 is the computationally expensive task from the example of FIG. 11, and so during execution of T1 the checkpoint abort threshold is set similar to the example of FIG. 11. T2 is a task requiring relatively few computational resources in comparison to T1 (e.g. T2 could be determining the maximum frequencies over the previous FFT calculated by T1). Hence, if the current state of processing at the time of the checkpointing interrupt is that processing is within task T2, then given that the memory input to T2 is small and self-contained, and that the earlier task T1 was computationally expensive, we determine that finishing the checkpointing is the best approach to take. The risk/cost ratio of losing all T1 results versus writing it to NVM leads to a decision that continuing the checkpointing is preferred.

Alternatively, if as shown in the dotted line in FIG. 12, task T1 is interrupted part way through, if the period of interruption is long enough, it may be that the data being processed in task T1 is no longer relevant (e.g. the sensor data being processed may no longer be relevant). Hence, if during the computation of an expensive task performed on input data, an interrupt occurs which leads to updated input data or any other indication that the input data for the interrupted task is no longer relevant, the abort probability can be raised on resumption of the task after the interruption as it is less critical to complete checkpointing of the now less relevant state of task T1. In any case, the interruption may cause task T1 to be restarted based on more relevant input data, in which case the profile of abort probability through the completion of the task could revert to the solid line shown in FIG. 12.

The particular threshold settings and mappings between current execution states and the threshold values may be set by the user by defining the lookup table 150. To help with setting the data in the lookup table 150, it can be useful to provide a back-annotation mechanism coming from runtime-captured information monitored during task execution or during checkpointing, or from a software profiler run while software code is developed and profiled. The runtime monitoring (carried out at runtime) or software profiling (carried out in advance) can provide information, for each of a number of annotated stages of execution of a task, including: a) an approximate size of the data to be saved if checkpointing was performed at that stage of execution, and b) the computational cost it took to compute the data to be saved. The threshold for a given point of program execution could depend not only on the checkpoint size and computational cost associated with that point program execution but also on the future checkpoint size expectations for subsequent points program execution (e.g. in the example of FIG. 11, the fact that checkpoint size is expected to reduce soon in future may be a consideration in the threshold being lower to reduce chance of the checkpoint aborting). Setting the LUT thresholds can be either a manual task performed by a person analysing the profiling information, or could be at least partially automated by setting a function or equation for setting the threshold based on the runtime-monitored information or software profiling information.

Hence, in summary, in an intermittent compute system with dynamic checkpointing, where a brownout warning causes the CPU to start a state-save (checkpoint) and shutdown routine, sometimes the brownout warnings are false, meaning that the power is recovered before the system requires to go to sleep. Writing to an NVM during the state-save is a time/power expensive task, and thus non-desired saves (where the state information will not be used in the future) are desired to be avoided. If the power is restored during the checkpoint routine, depending on the task the system is running it might make sense to stop the checkpoint routine and resume the normal CPU process. Alternatively, in other scenarios, it may be preferred to continue with checkpointing. The approach discussed above provides a hardware/software mechanism that enables the decision of whether to finish the checkpointing state or abort it on the fly, depending on checkpoint progress, and in some cases also on current execution state.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

What is claimed is:

1. A method comprising:
   in response to a power-loss warning event occurring during data processing, performing a checkpointing process to save a checkpoint of context data associated with the data processing to non-volatile data storage; and
   in response to detection of a power recovery event occurring when the checkpointing process is still in progress:
      determining, based at least on a checkpoint progress indication indicative of progress of the checkpointing process, whether a checkpoint abort condition is satisfied;
      in response to determining that the checkpoint abort condition is unsatisfied, allowing the checkpointing process to continue; and
      in response to determining that the checkpoint abort condition is satisfied, aborting the checkpointing process to allow the data processing to resume.

2. The method of claim 1, in which the checkpoint abort condition is determined to be satisfied when the checkpoint progress indication indicates that a completed amount of the checkpointing process is less than a threshold amount.

3. The method of claim 1, in which the checkpoint progress indication is maintained by software.

4. The method of claim 1, in which the checkpoint progress indication is maintained by hardware in a software-readable storage location.

5. The method of claim 1, in which determining whether the checkpoint abort condition is satisfied also depends on a current execution state of the data processing.

6. The method of claim 5, comprising:
   determining a checkpoint abort threshold amount depending on the current execution state of the data processing; and determining whether the checkpoint abort condition is satisfied depending on whether the checkpoint progress indication indicates that a completed amount of the checkpointing process is less than the checkpoint abort threshold amount.

7. The method of claim 6, in which the checkpoint abort threshold amount is determined based on a lookup table mapping the current execution state to the checkpoint completion threshold amount.

8. The method of claim 6, in which a function mapping the current execution state to the checkpoint abort threshold amount is obtained based on at least one of:
runtime-gathered information obtained during the data processing or previous attempts to perform the checkpointing process;
profiling information obtained by code profiling of software for performing the data processing.

9. The method of claim 5, in which the current execution state is represented by a value derived from a program counter value indicative of an instruction address representing a current point of program flow reached in the data processing.

10. The method of claim 5, in which the current execution state of the data processing is dependent on which task is being performed in the data processing.

11. The method of claim 5, in which the current execution state of the data processing is dependent on how much of a given task has been completed in the data processing.

12. The method of claim 11, in which for a task having a first point of execution and a second point of execution at which greater progress has been made than at the first point, a probability of the checkpoint abort condition being determined to be satisfied is higher at the first point than the second point.

13. The method of claim 12, in which the task also has a third point of execution at which greater progress has been made than at the second point, and the probability of the checkpoint abort condition being determined to be satisfied is higher at the third point than the second point.

14. The method of claim 13, in which the task is for processing input data to generate output data, and once the output data has been generated, the input data no longer needs to be checkpointed.

15. The method of claim 1, in which when a current execution state indicates that a current execution point is within a second task following a first task where the second task consumes less computational resource than the first task, a probability of the checkpoint abort condition being determined to be satisfied is lower than for at least one execution point within the first task.

16. The method of claim 1, in which the data processing is performed on an intermittent compute system.

17. The method of claim 1, in which the data processing is performed on a system powered using energy harvesting.

18. The method of claim 1, in which the power-loss warning event is detected in response to a supply voltage dropping below a power-loss warning threshold, and the power recovery event is detected in response to the supply voltage rising above a power recovery threshold.

19. A non-transitory computer readable storage medium storing a computer program which, when executed by a data processing apparatus, controls the data processing apparatus to perform the method of claim 1.

20. An apparatus comprising: checkpointing circuitry responsive to a power-loss warning event occurring during data processing to perform a checkpointing process to save a checkpoint of context data associated with the data processing to non-volatile data storage; and control circuitry responsive to detection of a power recovery event when the checkpointing process is still in progress, to: determine, based at least on a checkpoint progress indication indicative of progress of the checkpointing process, whether a checkpoint abort condition is satisfied; in response to determining that the checkpoint abort condition is unsatisfied, allow the checkpointing process to continue; and in response to determining that the checkpoint abort condition is satisfied, abort the checkpointing process to allow the data processing to resume.

* * * * *